United States Patent
Gierkink

(10) Patent No.: US 11,840,428 B2
(45) Date of Patent: Dec. 12, 2023

(54) LINKING DEVICE FOR ROTATABLY COUPLING WORKING EQUIPMENT TO A CRANE ON A WORKING MACHINE

(71) Applicant: Gierkink Exploitatie B.V., Vragender (NL)

(72) Inventor: Michel Bernardus Johanna Gierkink, Vragender (NL)

(73) Assignee: Gierkink Exploitatie B.V., Vragender (NL)

( * ) Notice: Subject to any disclaimer, the term of this patent is extended or adjusted under 35 U.S.C. 154(b) by 252 days.

(21) Appl. No.: 17/243,947

(22) Filed: Apr. 29, 2021

(65) Prior Publication Data

US 2021/0362984 A1 Nov. 25, 2021

(30) Foreign Application Priority Data

May 19, 2020 (NL) .................................... 2025623

(51) Int. Cl.
*F16C 11/10* (2006.01)
*B66C 3/00* (2006.01)
*A01G 23/00* (2006.01)

(52) U.S. Cl.
CPC ............ *B66C 3/005* (2013.01); *F16C 11/103* (2013.01); *A01G 23/003* (2013.01); *Y10T 403/32861* (2015.01)

(58) Field of Classification Search
CPC .................. B66C 3/005; F16C 11/103; Y10T 403/32319; Y10T 403/32861
See application file for complete search history.

(56) References Cited

U.S. PATENT DOCUMENTS

| 3,592,503 A | * | 7/1971 | Lundberg | ................ | B66C 3/005 |
| | | | | | 294/192 |
| 4,573,728 A | * | 3/1986 | Johnson | ................... | E02F 9/006 |
| | | | | | 188/83 |
| 4,679,839 A | | 7/1987 | Damron | | |

(Continued)

FOREIGN PATENT DOCUMENTS

| CA | 2 727 277 | * 12/2009 | ............. B66C 13/06 |
| DE | 9015088 U1 | 2/1991 | |
| WO | 1995/00765 A1 | 1/1995 | |

*Primary Examiner* — Michael P Ferguson
(74) *Attorney, Agent, or Firm* — Glen E. Schumann; Moss & Barnett

(57) ABSTRACT

The invention relates to a linking device for coupling working equipment, such as a head for harvesting trees, to the end of a crane boom on a working machine, said end comprising crane ears, wherein the linking device comprises a linking device body that supports a first rotation shaft defining a first rotation axis and a second rotation shaft defining a second rotation axis that runs substantially transverse to the first rotation axis, wherein the linking device is intended to be suspended by the first rotation shaft between the crane ears for free rotation of the linking device around the first rotation axis on the crane boom, wherein the linking device comprises first braking means for braking the rotational movement of the linking device around the first rotation axis, wherein the first braking means are arranged to move at least one of the crane ears towards the other to clamp the linking device body between the crane ears.

18 Claims, 4 Drawing Sheets

(56) References Cited

U.S. PATENT DOCUMENTS

| | | | | |
|---|---|---|---|---|
| 4,810,020 A * | 3/1989 | Powell | ................... | B66C 3/005 |
| | | | | 188/381 |
| 5,110,169 A * | 5/1992 | Shepherd | .................. | F16F 7/04 |
| | | | | 188/367 |
| 9,067,764 B2 * | 6/2015 | Martinsons | ............. | F16F 7/023 |
| 2013/0071173 A1 * | 3/2013 | Steindl | ................... | B66C 3/005 |
| | | | | 403/91 |
| 2014/0027222 A1 * | 1/2014 | Martinsons | ............. | B66C 3/005 |
| | | | | 188/381 |

\* cited by examiner

LINKING DEVICE FOR ROTATABLY COUPLING WORKING EQUIPMENT TO A CRANE ON A WORKING MACHINE

REFERENCE TO RELATED APPLICATION

This application claims priority to Dutch Application No. NL2025623, which was filed on May 19, 2020. The contents of which are incorporated herein by reference.

FIELD OF THE INVENTION

The present invention relates to a linking device for rotatably coupling working equipment, such as a head for harvesting trees, to an end of a crane boom on a working machine, said end comprising crane ears, wherein the linking device comprises a linking device body that supports a first rotation shaft defining a first rotation axis and a second rotation shaft defining a second rotation axis that runs substantially transverse to the first rotation axis, wherein the linking device is intended to be suspended by the first rotation shaft between the crane ears for free rotation around the first rotation axis on the crane boom.

BACKGROUND

Such a linking device is known in the art and generally referred to as link. The present invention has for its object to provide such a linking device with braking means. The linking device according to the invention thereto comprises first braking means for braking the rotational movement of the linking device around the first rotation axis.

In the coupled state the linking device with the working equipment swings freely on the crane boom until the braking means are activated and the linking device is frozen in its current position. After deactivating the braking means the linking device with the working equipment and its load will start to hang down from the crane boom under the force of gravity.

When the working equipment comprises a head for harvesting trees, said head can clamp a tree branch from all directions and saw without tension. Once the braking means are activated the linking device becomes rigid and holds the head clamping the tree branch in its sawed-off position. The operator can now safely remove the tree branch that may for example have been hanging over a house to a free space. By deactivating the braking means the head with the tree branch will start to hang down.

It is noted that a linking device with braking means is known per se in the art from the international patent application WO95/00765. In the known linking device, herein referred to as articulated apparatus, the braking means act on the inner side of a frame part of the crane boom. The present invention has for its object to improve the known linking device.

The linking device according to the invention distinguishes over WO95/00765 in that the first braking means are arranged to move at least one of the crane ears towards the other to clamp the linking device body between the crane ears. By clamping the crane ears a larger braking force can be reached. It is noted that the linking device according to the invention is known from U.S. Pat. No. 4,679,839.

SUMMARY OF THE INVENTION

In a first preferred embodiment the first braking means are arranged to move both crane ears towards each other to clamp the linking device body between the crane ears.

As the first braking means act on the outside of one or both crane ears consequently the dimensions of the first braking means, more specifically the contact surface of the first braking means on the crane ears, can be chosen as large as necessary to achieve the desired braking force.

This contrasts with the known linking device of WO95/00765 in which the dimensions of the first braking means are limited by the inner dimensions of the crane end.

In an advantageous preferred embodiment of the linking device according to the invention the first braking means are arranged on the first rotation shaft.

By integrating the first braking means in the first rotation shaft the dimensions of the linking device can be kept very compact.

According to the invention the linking device comprises two linking device ears attached to the link body, wherein the linking device ears support the second rotation shaft for free rotation around the second rotation axis, wherein the linking device further comprises equipment coupling means for coupling the working equipment that are fixedly attached to the second rotation shaft, wherein the linking device comprises second braking means for braking the rotational movement around the second rotation axis, wherein the second braking means are arranged to move at least one of the linking device ears towards the other to clamp the equipment coupling means between the linking device ears.

Thanks to the introduction of linking device ears that support the second rotation shaft second braking means similar to the first braking means can be used having the same advantages. The introduction of equipment coupling means further contributes to this as they project beyond the linking device ears.

Consequently, the position of the working equipment is lowered with respect to the second rotation shaft outside clamping reach of the linking device ears. Preferably the equipment coupling means are generally plate shaped.

In a preferred embodiment of the linking device according to the invention the second braking means are arranged to move both linking device ears towards each other to clamp the equipment coupling means between the linking device ears.

According to an elegant preferred embodiment of the linking device according to the invention the linking device ears extend from the first rotation shaft along the linking device body and the second braking means clamp the equipment coupling means against the linking device body during movement of the at least one of the linking device ears. Preferably the linking device ears are generally plate shaped.

In another advantageous preferred embodiment of the linking device according to the invention the second braking means are arranged on the second rotation shaft.

By integrating the second braking means in the second rotation shaft the dimensions of the linking device can be kept very compact.

In a reliable preferred embodiment of the linking device according to the invention the first braking means comprise a first hydraulic cylinder having a first piston that acts on the outside of one of the crane ears. In a further practical and reliable preferred embodiment of the linking device according to the invention the second braking means comprise a second hydraulic cylinder having a second piston that acts on the outside of one of the linking device ears. The hydraulic drive and controls that are used to operate the crane and are present on a typical working machine, such as a harvester, can advantageously be used to control the first and/or second braking means as well.

In a practical preferred embodiment of the linking device according to the invention friction plates are arranged around the first and/or second rotation shaft.

Preferably the equipment coupling means are provided with friction material. Due to the use of friction plates and/or friction material the braking force can be enhanced.

The first braking means, and the second braking means can be designed independently from each other by choosing the cylinder type and/or the friction plates and/or the friction material. Consequently, at the same hydraulic pressure the resulting braking force on the first and second rotation axes can be made different.

Preferably, the linking device according to the invention can be designed such that a larger braking force can be exerted on the first rotation shaft, since this is the direction in which the crane boom is strongest.

In general, the braking means of the limiting device according to the invention can be optimally adjusted to any type of crane. More specifically the maximum braking force of the braking means can be adjusted to the load capacity of the crane.

BRIEF DESCRIPTION OF DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

The invention further relates to a crane provided with a linking device according to the invention and to a working machine, such as a harvester, provided with such a crane.

Figure 1:
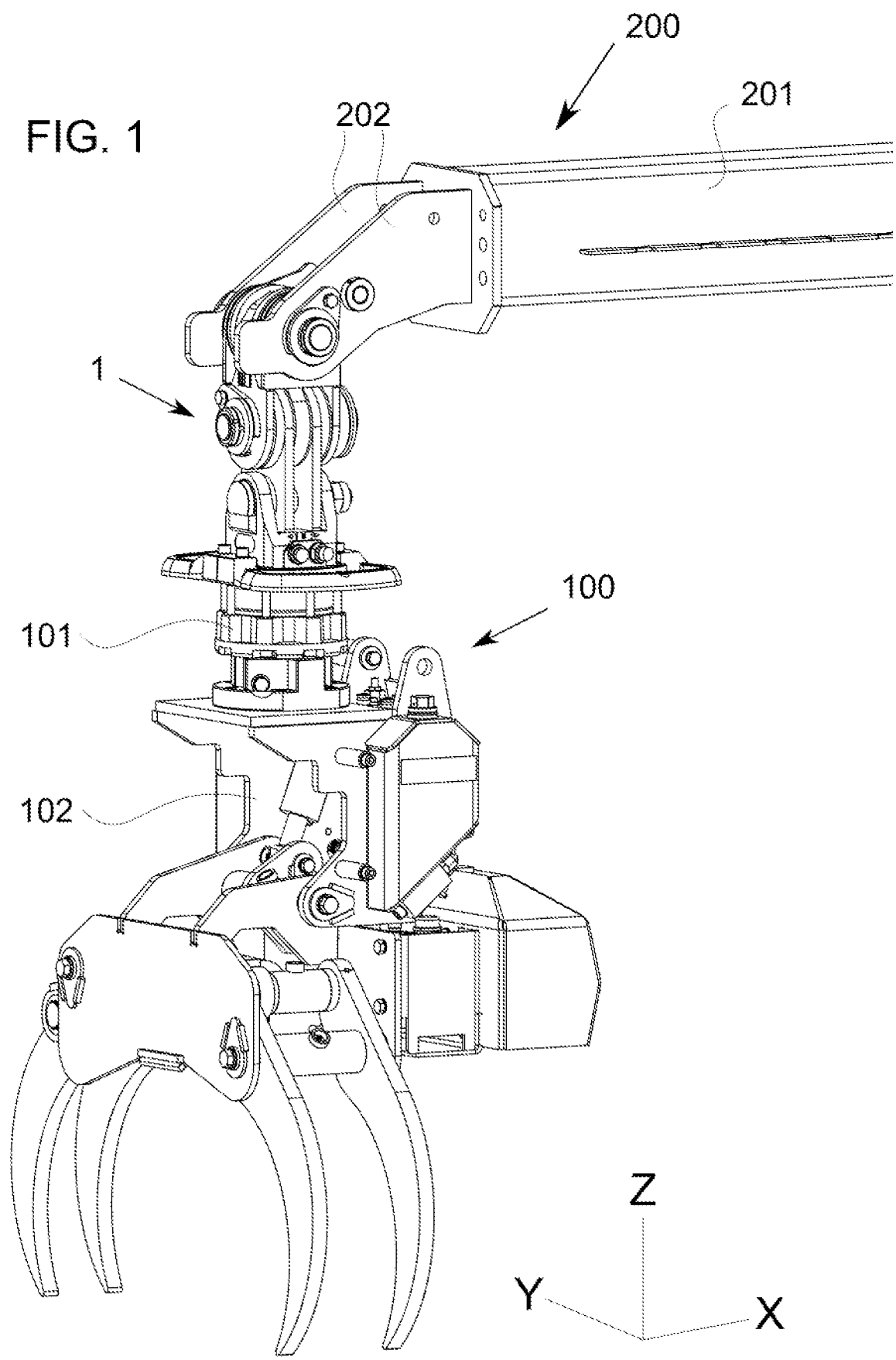
Figure 2:
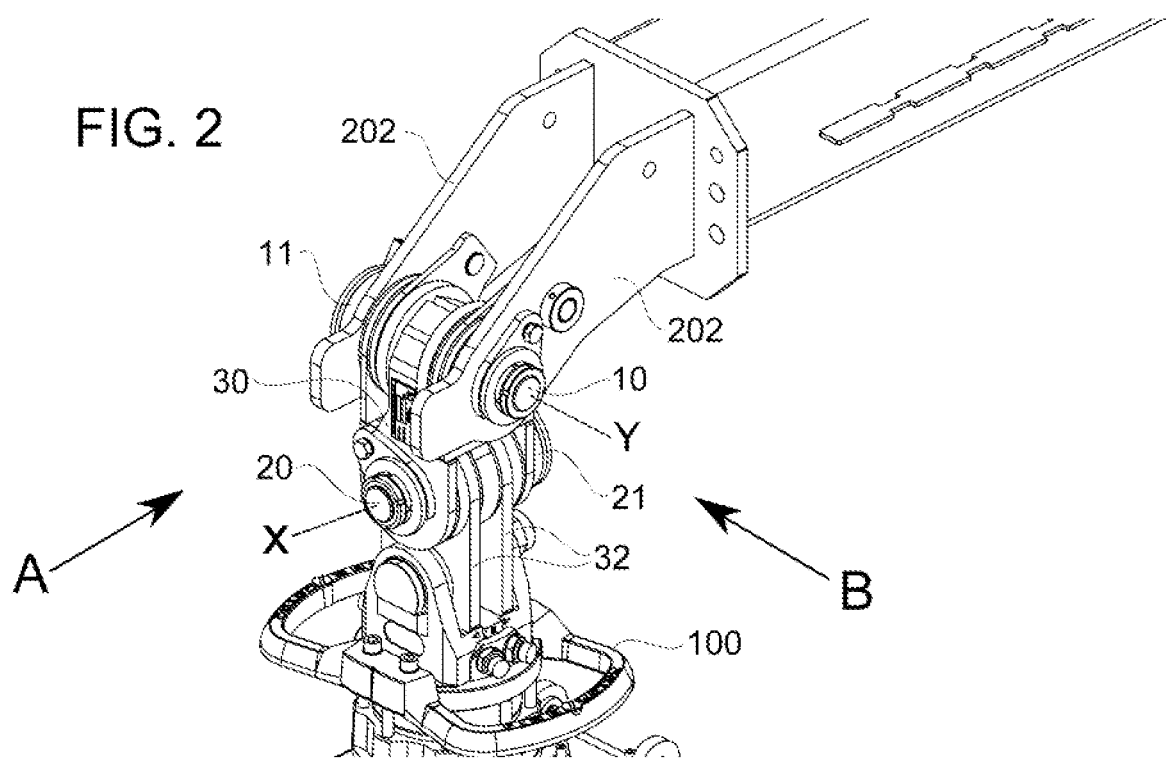
Figure 3:
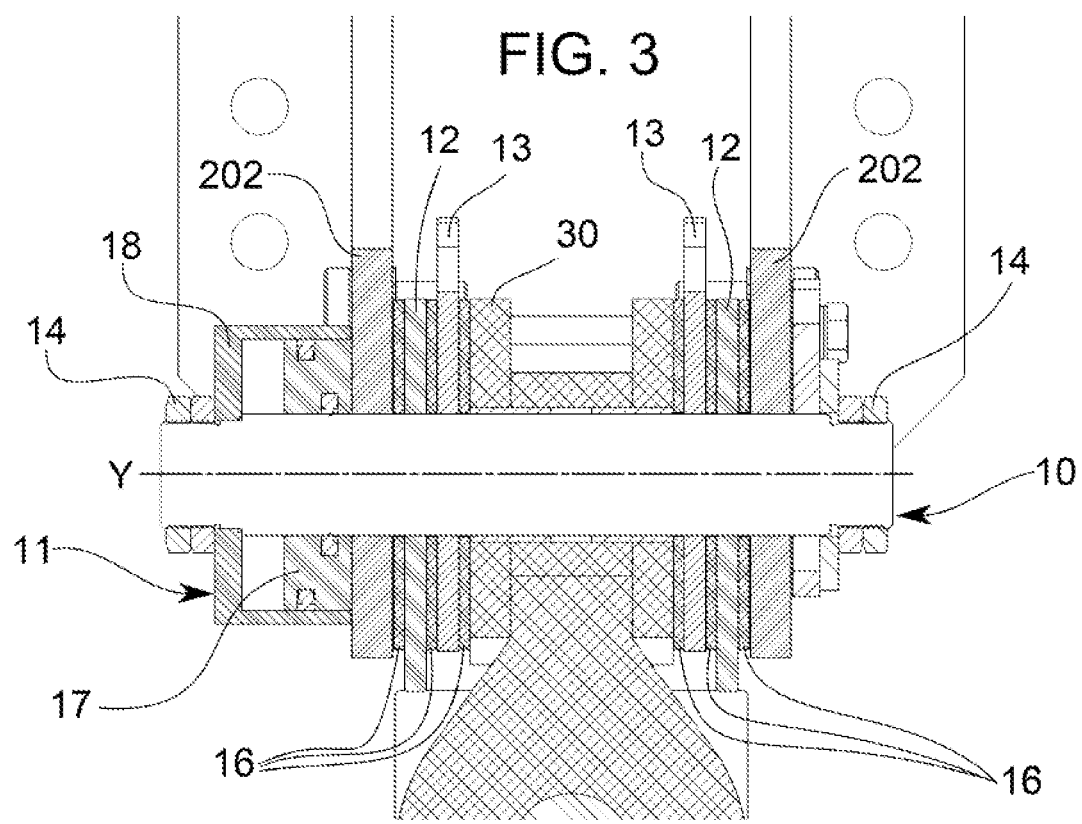
Figure 4:
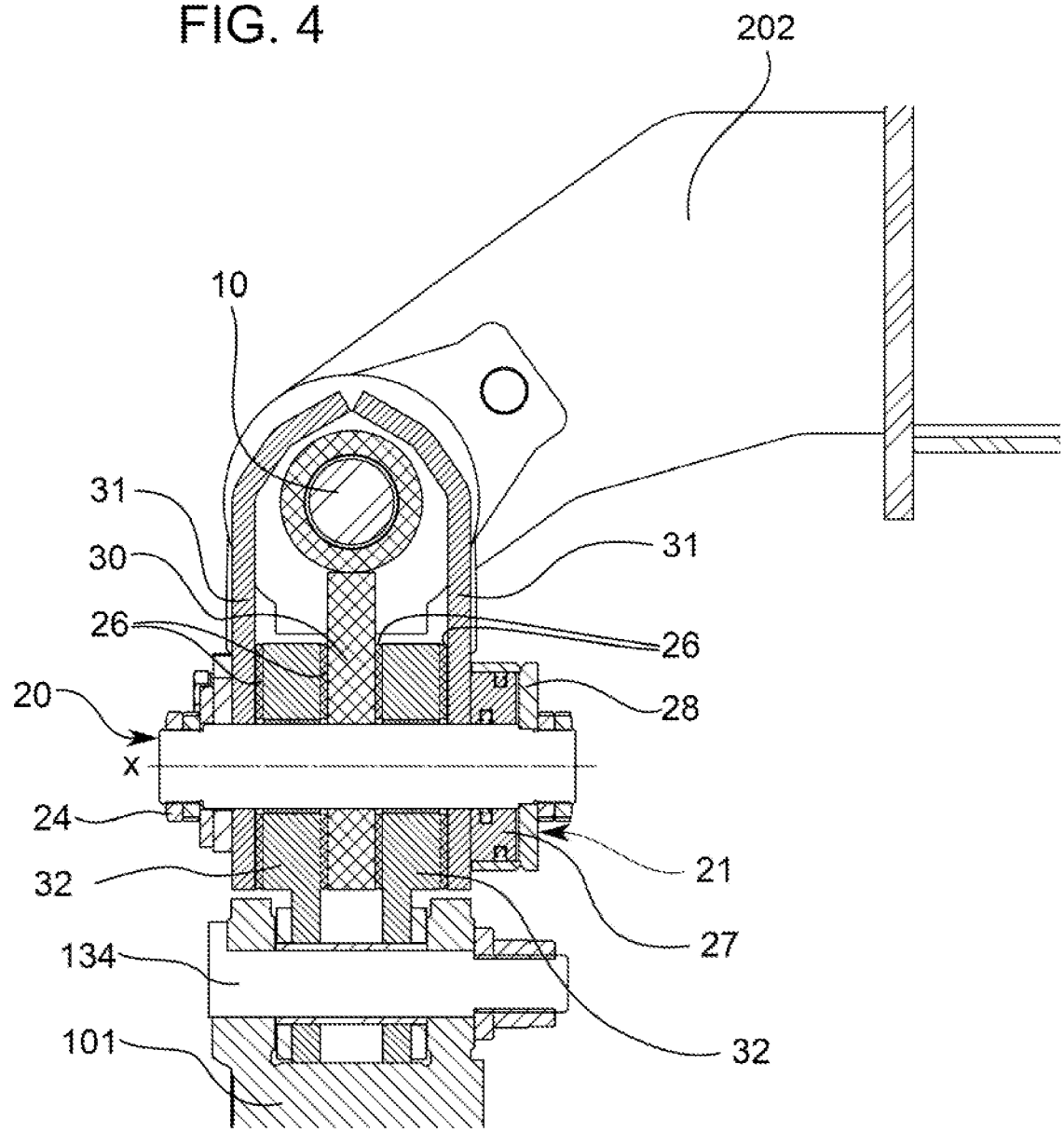

The invention will now be further elucidated with reference to the annexed figures, in which:

FIG. 1 shows a schematic view of a preferred embodiment of a linking device according to the invention in the coupled state;

FIG. 2 shows the linking device of FIG. 1 in more detail;

FIG. 3 shows a cross sectional view A of part of the linking device of FIG. 2; and FIG. 4 shows another cross-sectional view B of part of the linking device of FIG. 2.

DETAILED DESCRIPTION

FIG. 1 shows a schematic view of a preferred embodiment of a linking device 1 according to the invention in the coupled state, wherein it is coupled to the end of a boom 201 of a crane 200 and to working equipment 100. The crane boom end is formed by crane ears 202 having a general plate shape. The working equipment 100 comprises by way of example a rotator 101 and a head 102 for harvesting trees. The crane is present on a suitable working machine (not shown).

An example of a felling head is the GMT035, which has been developed by the same inventor and is described in European patent EP2515628. An example of a crane boom end with ears is the GMT Fly Jib, which was developed by the same inventor and is described in Dutch patent application NL2023186. Both products are commercially available.

FIG. 2 shows the linking device 1 in more detail. The linking device 1 comprises a linking device body 30 that supports a first rotation shaft 10 defining a first rotation axis Y and a second rotation shaft 20 defining a second rotation axis X that runs substantially transverse to the first rotation axis Y.

The linking device 1 is intended to be suspended from the crane ears 202 via the first rotation shaft 10 for free rotation of the linking device 1 around the first rotation axis Y on the crane boom.

The second rotation shaft 20 is suspended from the central linking device body 30 for free rotation. Equipment coupling means 32 are fixed to the second rotation shaft 20 to couple the working equipment 100.

Coupled working equipment can thus freely rotate around the first rotation axis Y and around the second rotation axis X.

The linking device 1 comprises first braking means 11 for braking the rotational movement of the first rotation shaft 10 of the linking device 1. According to the invention the first braking means 11 are arranged to move at least one of the crane ears 202 towards the other to clamp the linking device body 30 between the crane ears 202.

FIG. 3 shows a cross sectional view of part of the linking device 1. The cross section is taken through the Y-axis as seen from viewpoint A in FIG. 2.

FIG. 4 shows another cross-sectional view B of part of the linking device 1. The cross section is taken through the X-axis as seen from viewpoint B in FIG. 2.

In the preferred embodiment shown the linking device body 30 comprises linking device ears 31 having a general plate shape. The linking device ears 31 extend downwards from the location of the first rotation shaft 10 and are arranged for supporting the second rotation shaft 20 for free rotation around the second rotation axis X.

The equipment coupling means 32 are fixed on the second rotation shaft 20. The linking device 1 comprises second braking means 21 for braking the rotational movement of the second rotation shaft. According to the invention the second braking means are arranged to move at least one of the linking device ears 31 towards the other to clamp equipment coupling means 32 between the linking device ears. In the preferred embodiment shown the linking device ears 31 extend along the linking device body 30 and the second braking means 21 clamp the equipment coupling means 32 against the linking device body 30 during movement of the at least one of the linking device ears 31. Preferably the equipment coupling means 32 are generally plate shaped.

As shown in FIG. 4 the equipment coupling means 32 are attached to the second rotation shaft 20 and are partly positioned between the linking device ears 31 and the linking device body 30. Outer ends of the equipment coupling means 32 extend beyond the linking device ears 31 and are arranged to couple to the working equipment 100. The equipment coupling means 32 inherently lower the position of the working equipment, in this example the rotator 101, with respect to the second rotation shaft 20.

In the preferred embodiment shown the first braking means 11 are arranged on the first rotation shaft 10 and the second braking means 21 are arranged on the second rotation shaft 20. The first braking means comprise a first hydraulic cylinder having a housing 18 with a first piston 17 that in the coupled state of the linking device 1 act on the outside of both crane ears 202. The second braking means comprise a second hydraulic cylinder having a housing 28 with a second piston 27 that act on both linking device ears 31. The hydraulic cylinders can be connected to the hydraulic drive and controls that are used to operate the crane and are present on a typical working machine, such as a harvester.

In the preferred embodiment shown friction plates are arranged around the first rotation shaft 10. Friction plates 12 are supported by the linking device body 30 and rotate together with the linking device body 30. Friction plates 13 are intended for attachment to the crane ears 202 in the coupled state of the linking device 1.

Preferably friction material is arranged on several contact areas to enlarge the clamping force. In the preferred embodiment shown friction material 16 is arranged on one side of the friction plates 12 and on both sides of the friction plates 13.

In the preferred embodiment shown friction material 26 is arranged on both sides of the equipment coupling means 32.

Several means are available in the art to couple the linking device 1 according to the present invention to crane ears of a crane on a working machine. The nuts 14 shown in FIG. 3 are merely an example. Several means are available in the art to couple working equipment to the equipment coupling means 32 of the linking device 1 according to the present invention. The pen 134 shown in FIG. 4 is the original pen of the rotator and is shown merely as an example. Also, the nuts 24 in FIG. 4 that attach the second rotation shaft 20 to the linking device ears 31 are merely an example.

The present invention is of course not limited to the preferred embodiment shown and described herein but extends to any preferred embodiment that falls within the scope of the appended claims, viewed in light of the appended figures.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. Linking device for coupling working equipment to the end of a crane boom on a working machine, said end comprising crane ears, wherein the linking device comprises a linking device body that supports a first rotation shaft defining a first rotation axis and a second rotation shaft defining a second rotation axis that runs substantially transverse to the first rotation axis, wherein the linking device is intended to be suspended by the first rotation shaft between the crane ears for free rotation around the first rotation axis on the crane boom, wherein the linking device comprises first rotational control means for braking the rotational movement around the first rotation axis, wherein the first rotational control means comprise a first pressure cylinder having a first piston that acts on one of the crane ears, wherein the first rotational control means act on an outside of the crane ears to move at least one of the crane ears towards the other to clamp the linking device body between the crane ears, characterised in that the linking device comprises linking device ears attached to the linking device body, wherein the linking device ears extend on opposite sides along the linking device body, wherein the linking device ears extend parallel to the first rotation shaft and the linking device body and away from the first rotation shaft along the linking device body, wherein the linking device ears and the linking device body comprise aligned openings therethrough which support the second rotation shaft for free rotation around the second rotation axis, wherein the linking device further comprises equipment coupling means for coupling the working equipment that are fixedly attached to the second rotation shaft, wherein the linking device comprises second rotational control means for braking the rotational movement around the second rotation axis, wherein the second rotational control means comprise a second pressure cylinder having a second piston that acts on one of the linking device ears, wherein the second rotational control means act on an outside of the linking device ears to move at least one of the linking device ears towards the other to clamp the equipment coupling means between the linking device ears against the opposite sides of the linking device body.

2. Linking device according to claim 1, wherein the first rotational control means are arranged to move both crane ears towards each other to clamp the linking device body between the crane ears.

3. Linking device according to claim 1, wherein the first rotational control means are arranged on the first rotation shaft.

4. Linking device according to claim 1, wherein the second rotational control means are arranged to move both linking device ears towards each other to clamp the equipment coupling means between the linking device ears.

5. Linking device according to claim 1, wherein the second rotational control means clamp the equipment coupling means against the linking device body during movement of the at least one of the linking device ears.

6. Linking device according to claim 1, wherein the linking device ears are generally plate shaped.

7. Linking device according to claim 1, wherein the second rotational control means are arranged on the second rotation shaft.

8. Linking device according to claim 1, wherein the first pressure cylinder comprises a hydraulic cylinder having a first piston that acts on the outside of one of the crane ears.

9. Linking device according to claim 1, wherein the second pressure cylinder comprises a hydraulic cylinder having a second piston that acts on the outside of one of the linking device ears.

10. Linking device according to claim 1, wherein friction plates are arranged around the first rotation shaft.

11. Linking device according to claim 1, wherein the equipment coupling means are provided with friction material.

12. Linking device according to claim 1, wherein the equipment coupling means are generally plate shaped.

13. Linking device according to claim 1, wherein equipment coupling means project beyond the linking device ears to lower the position of the working equipment with respect to the second rotation shaft.

14. Crane provided with a linking device according to claim 1.

15. Working machine provided with a crane according to claim 14.

16. Working machine according to claim 15, wherein the working machine is a harvester.

17. Linking device according to claim 1, wherein the linking device comprises friction material that is positioned between the linking device ears and the equipment coupling means and between the equipment coupling means and the linking device body.

18. Linking device according to claim 1, wherein the working equipment is a head for harvesting trees.

\* \* \* \* \*